United States Patent
Elshafie et al.

(10) Patent No.: US 12,089,035 B2
(45) Date of Patent: Sep. 10, 2024

(54) PHYSICAL CHANNEL ENCRYPTION USING SECRET KEYS

(71) Applicant: QUALCOMM Incorporated, San Diego, CA (US)

(72) Inventors: Ahmed Elshafie, San Diego, CA (US); Hung Dinh Ly, San Diego, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/445,671

(22) Filed: Aug. 23, 2021

(65) Prior Publication Data
US 2023/0056352 A1  Feb. 23, 2023

(51) Int. Cl.
*H04W 12/0431* (2021.01)
*H04W 12/033* (2021.01)
*H04W 12/041* (2021.01)

(52) U.S. Cl.
CPC ..... *H04W 12/0431* (2021.01); *H04W 12/033* (2021.01); *H04W 12/041* (2021.01)

(58) Field of Classification Search
CPC ............... H04W 12/041; H04W 12/03; H04W 12/0433; H04W 12/033; H04W 28/18; H04W 48/12; H04W 56/001; H04W 72/21; H04W 72/23; H04W 12/0431; H04L 9/14; H04L 63/065; H04L 63/068
See application file for complete search history.

(56) References Cited

U.S. PATENT DOCUMENTS

| 10,243,929 B2 | 3/2019 | Lee et al. | |
| 10,771,441 B2 * | 9/2020 | Neumann | H04L 9/3247 |
| 2009/0040957 A1 * | 2/2009 | Anschutz | H04L 12/189 |
| | | | 370/312 |
| 2015/0092942 A1 * | 4/2015 | Wager | H04L 9/0869 |
| | | | 380/270 |

(Continued)

FOREIGN PATENT DOCUMENTS

| WO | WO-2020155138 A1 * | 8/2020 |
| WO | WO-2021052697 A1 * | 3/2021 |

(Continued)

OTHER PUBLICATIONS

Longwang, et al. Efficient Physical-Layer Secret Key Generation and Authentication Schemes Based on Wireless Channel-Phase, Mobile Information Systems, vol. 2017, Article ID 7393526, 13 pages, 2017. https://doi.org/10.1155/2017/7393526 (Year: 2017).*

(Continued)

*Primary Examiner* — Lizbeth Torres-Diaz
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may determine, based at least in part on a key derivation function and a set of physical layer parameters, a secret key for encrypting a unicast physical channel at a physical layer, wherein the secret key is a UE-specific secret key. The UE may transmit, to a base station, an encrypted transmission over the unicast physical channel based at least in part on the secret key. Numerous other aspects are described.

30 Claims, 14 Drawing Sheets

1000 →

(56) References Cited

U.S. PATENT DOCUMENTS

| | | | | |
|---|---|---|---|---|
| 2015/0281958 | A1* | 10/2015 | Simplicio Junior | H04B 1/3816 |
| | | | | 713/155 |
| 2016/0205547 | A1* | 7/2016 | Rajadurai | H04W 12/0433 |
| | | | | 726/4 |
| 2017/0289108 | A1* | 10/2017 | Lee | H04W 76/27 |
| 2020/0145817 | A1* | 5/2020 | Liu | H04W 12/037 |
| 2021/0195563 | A1 | 6/2021 | Lee et al. | |
| 2021/0297853 | A1* | 9/2021 | Lee | H04W 72/30 |
| 2021/0377025 | A1* | 12/2021 | Giraud | H04L 9/3066 |

FOREIGN PATENT DOCUMENTS

| | | |
|---|---|---|
| WO | WO-2021063470 A1 | 4/2021 |
| WO | WO-2021188377 A1 | 9/2021 |

OTHER PUBLICATIONS

Ongwang, et al. Efficient Physical-Layer Secret Key Generation and Authentication Schemes Based on Wireless Channel-Phase, Mobile Information Systems, vol. 2017, Article ID 7393526, 13 pages, 2017. https://doi.org/10.1155/2017/7393526 (Year: 2017).*

International Search Report and Written Opinion—PCT/US2022/075143—ISA/EPO—Dec. 9, 2022.

* cited by examiner

PHYSICAL CHANNEL ENCRYPTION USING SECRET KEYS

FIELD OF THE DISCLOSURE

Aspects of the present disclosure generally relate to wireless communication and to techniques and apparatuses for physical channel encryption using secret keys.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: determine, based at least in part on a key derivation function and a set of physical layer parameters, a secret key for encrypting a unicast physical channel at a physical layer, wherein the secret key is a UE-specific secret key; and transmit, to a base station, an encrypted transmission over the unicast physical channel based at least in part on the secret key.

In some implementations, an apparatus for wireless communication at a base station includes a memory and one or more processors, coupled to the memory, configured to: determine, based at least in part on a key derivation function and a set of physical layer parameters, a secret key for encrypting a unicast physical channel at a physical layer, wherein the secret key is a UE-specific secret key; and transmit, to a UE, an encrypted transmission over the unicast physical channel based at least in part on the secret key.

In some implementations, a method of wireless communication performed by a UE includes determining, based at least in part on a key derivation function and a set of physical layer parameters, a secret key for encrypting a unicast physical channel at a physical layer, wherein the secret key is a UE-specific secret key; and transmitting, to a base station, an encrypted transmission over the unicast physical channel based at least in part on the secret key.

In some implementations, a method of wireless communication performed by a base station includes determining, based at least in part on a key derivation function and a set of physical layer parameters, a secret key for encrypting a unicast physical channel at a physical layer, wherein the secret key is a UE-specific secret key; and transmitting, to a UE, an encrypted transmission over the unicast physical channel based at least in part on the secret key.

In some implementations, a non-transitory computer-readable medium storing a set of instructions for wireless communication includes one or more instructions that, when executed by one or more processors of a UE, cause the UE to: determine, based at least in part on a key derivation function and a set of physical layer parameters, a secret key for encrypting a unicast physical channel at a physical layer, wherein the secret key is a UE-specific secret key; and transmit, to a base station, an encrypted transmission over the unicast physical channel based at least in part on the secret key.

In some implementations, a non-transitory computer-readable medium storing a set of instructions for wireless communication includes one or more instructions that, when executed by one or more processors of a base station, cause the base station to: determine, based at least in part on a key derivation function and a set of physical layer parameters, a secret key for encrypting a unicast physical channel at a physical layer, wherein the secret key is a UE-specific secret key; and transmit, to a UE, an encrypted transmission over the unicast physical channel based at least in part on the secret key.

In some implementations, an apparatus for wireless communication includes means for determining, based at least in part on a key derivation function and a set of physical layer parameters, a secret key for encrypting a unicast physical channel at a physical layer, wherein the secret key is an apparatus-specific secret key; and means for transmitting, to a base station, an encrypted transmission over the unicast physical channel based at least in part on the secret key.

In some implementations, an apparatus for wireless communication includes means for determining, based at least in part on a key derivation function and a set of physical layer parameters, a secret key for encrypting a unicast physical channel at a physical layer, wherein the secret key is a UE-specific secret key; and means for transmitting, to a UE, an encrypted transmission over the unicast physical channel based at least in part on the secret key.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
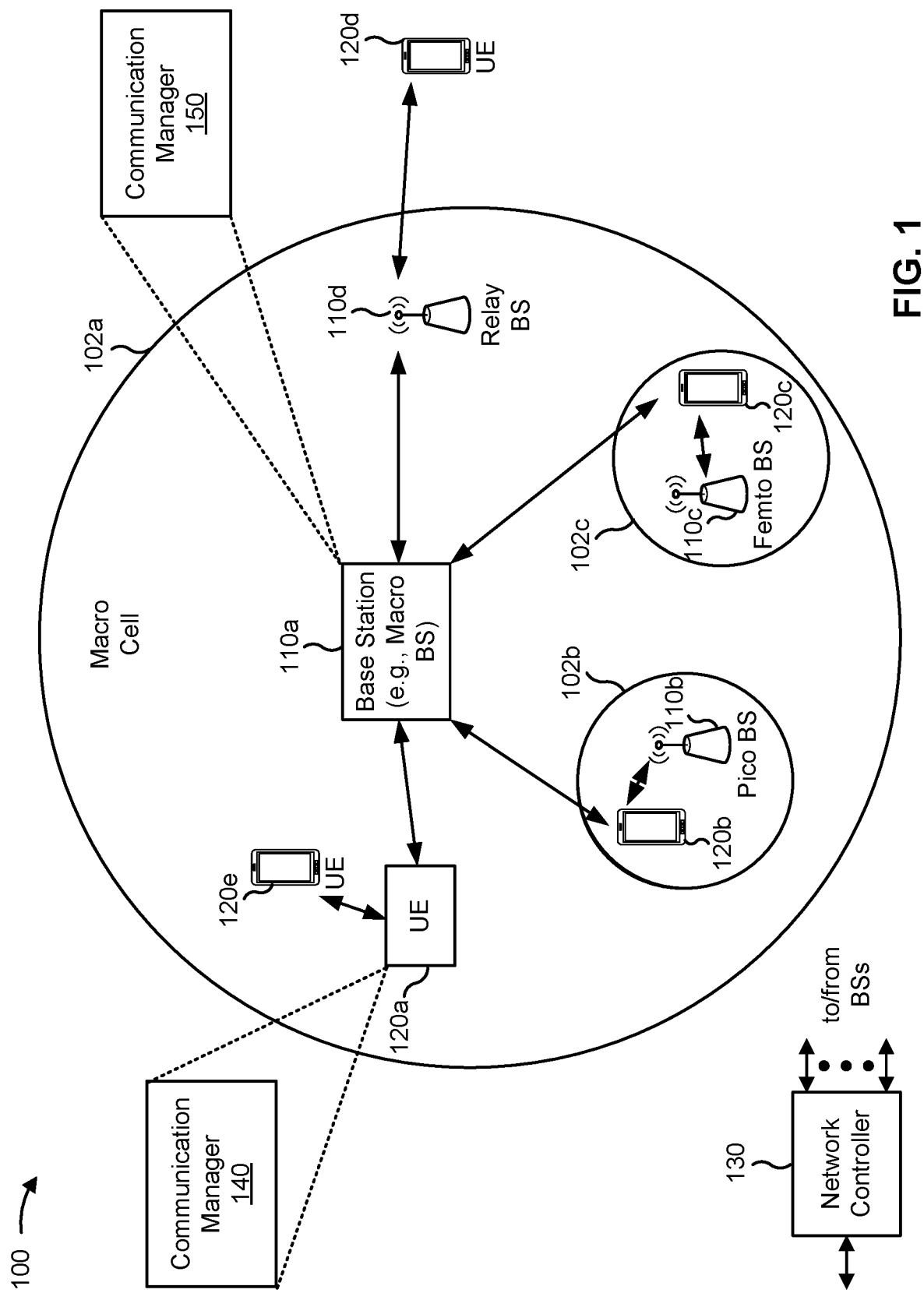
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may determine, based at least in part on a key derivation function and a set of physical layer parameters, a secret key for encrypting a unicast physical channel at a physical layer, wherein the secret key is a UE-specific secret key; and transmit, to a base station, an encrypted transmission over the unicast physical channel based at least in part on the secret key. Additionally, or alternatively, the communication manager 140 may perform one or more other operations described herein.

In some aspects, a base station (e.g., base station 110) may include a communication manager 150. As described in more detail elsewhere herein, the communication manager 150 may determine, based at least in part on a key derivation function and a set of physical layer parameters, a secret key for encrypting a unicast physical channel at a physical layer, wherein the secret key is a UE-specific secret key; and transmit, to a UE, an encrypted transmission over the unicast physical channel based at least in part on the secret key. Additionally, or alternatively, the communication manager 150 may perform one or more other operations described herein.

As indicated above, FIG. 1 is provided as an example. Other examples may differ from what is described with regard to FIG. 1.

Figure 2:
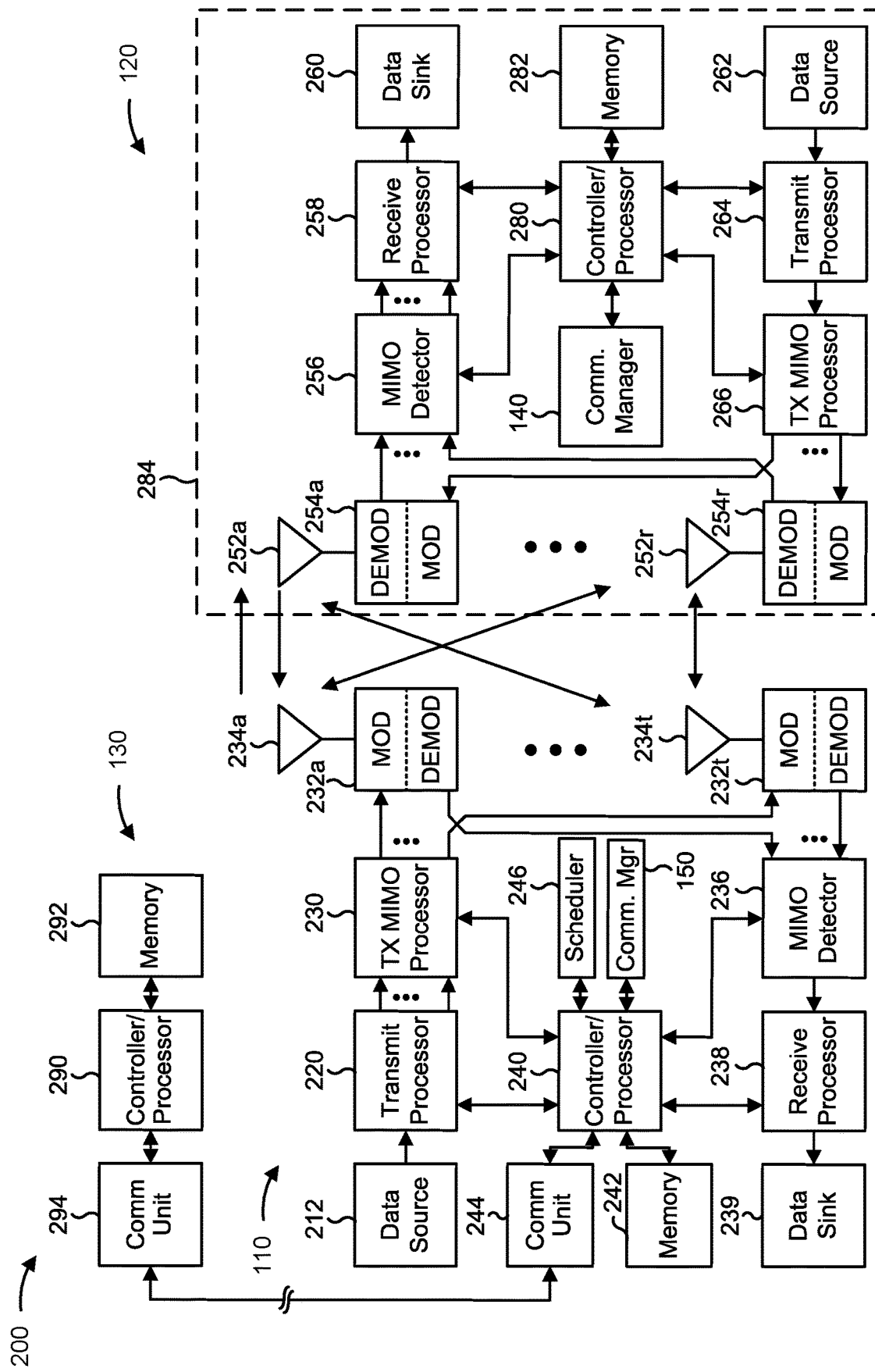
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-14).

The controller/processor 240 of the base station 110, the controller/processor 280 of the UE 120, and/or any other component(s) of FIG. 2 may perform one or more techniques associated with physical channel encryption using secret keys, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for determining, based at least in part on a key derivation function and a set of physical layer parameters, a secret key for encrypting a unicast physical channel at a physical layer, wherein the secret key is a UE-specific secret key; and/or means for transmitting, to a base station, an encrypted transmission over the unicast physical channel based at least in part on the secret key. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for determining, based at least in part on a key derivation function and a set of physical layer parameters, a secret key for encrypting a unicast physical channel at a physical layer, wherein the secret key is a UE-specific secret key; and/or means for transmitting, to a UE, an encrypted transmission over the unicast physical channel based at least in part on the secret key. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Secure communications are vital for wireless communication systems. Security may also be crucial for IoT since many devices may be connected to each other. Additional security bits for channels and sounding signals between legitimate nodes may be added to improve security for the wireless communication systems.

Figure 3:
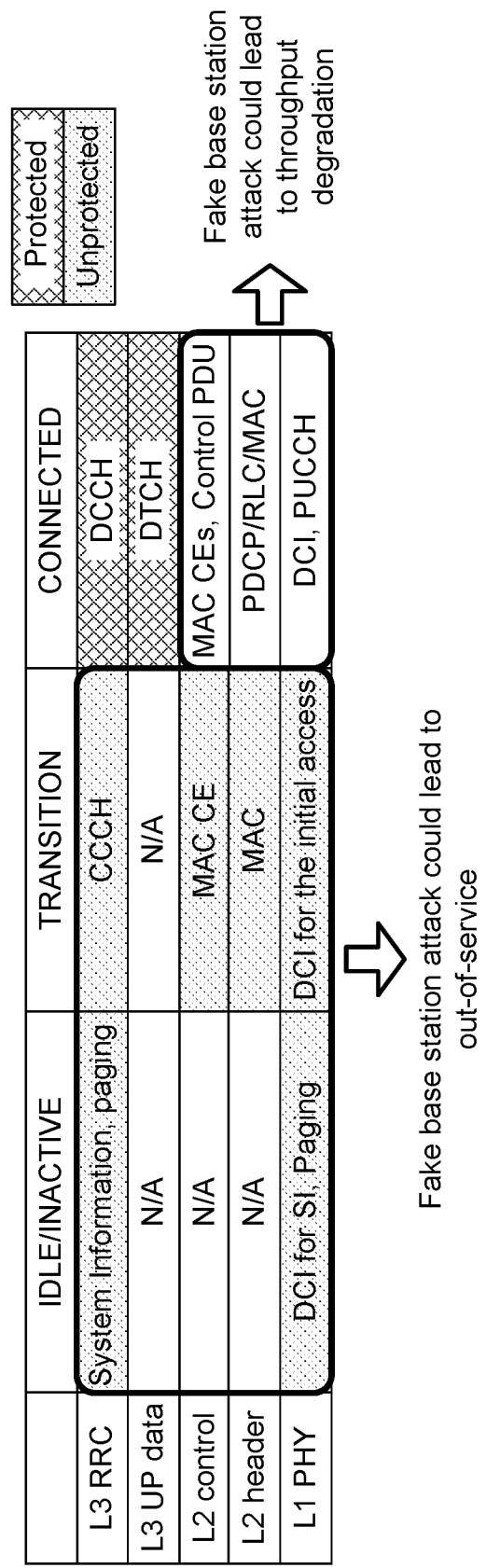
FIG. 3 is a diagram illustrating an example of secure communications, in accordance with the present disclosure.

FIG. 3 is a diagram illustrating an example 300 of secure communications, in accordance with the present disclosure.

A UE may be in an idle/inactive state, a transition state, or a connected state. In the idle/inactive state, system information and paging via layer 3 (L3) radio resource control (RRC) signaling may be unprotected (or not secure). In the idle/inactive state, downlink control information (DCI) for system information (SI) and paging via layer 1 (L1) physical (PHY) signaling may be unprotected. In the transition state, a common control channel (CCCH) via the L3 RRC signaling may be unprotected. In the transition state, a medium access control control element (MAC-CE) via layer 2 (L2) control signaling may be unprotected. In the transition state, a medium access control (MAC) layer associated with an L2 header may be unprotected. In the transition state, DCI for an initial access via L1 PHY signaling may be unprotected. In the connected state, a dedicated control channel (DCCH) via L3 RRC signaling may be protected (or secure). In the connected state, a dedicated traffic channel (DTCH) via L3 user plane data signaling may be protected. In the connected state, MAC-CEs and control protocol data units (PDUs) via L2 control signaling may be unprotected. In the connected state, a packet data convergence protocol (PDCP) layer, a radio link control (RLC) layer, and/or a MAC layer associated with an L2 header may be unprotected. In the connected state, DCI and a physical uplink control channel (PUCCH) via L1 PHY signaling may be unprotected. As a result, due to many channels not being protected, attacks such as fake base station attacks may lead to out-of-service or throughput degradation for the UE.

As indicated above, FIG. 3 is provided as an example. Other examples may differ from what is described with regard to FIG. 3.

Figure 4:
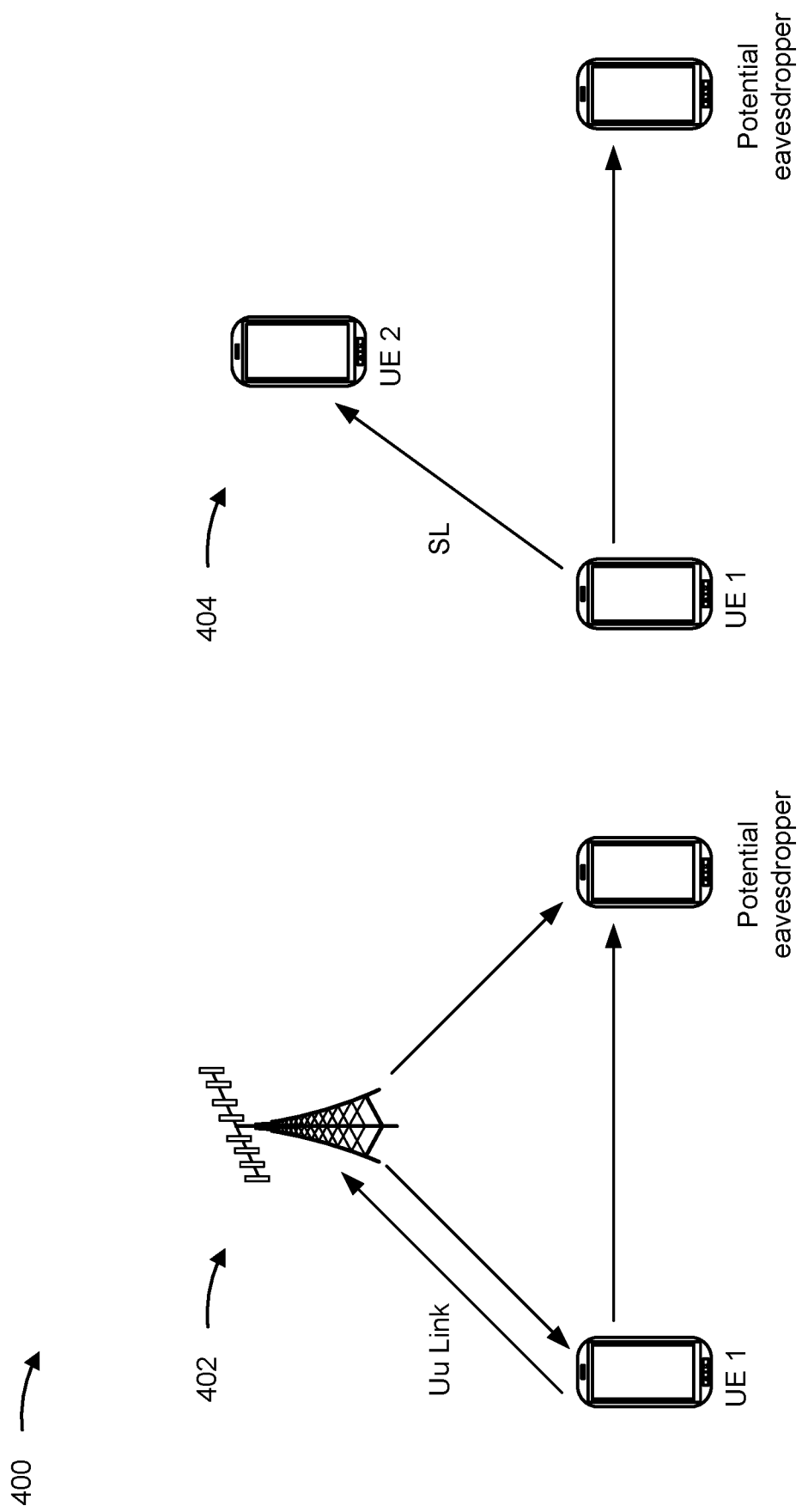
FIG. 4 is a diagram illustrating an example of a potential eavesdropper UE, in accordance with the present disclosure.

FIG. 4 is a diagram illustrating an example 400 of a potential eavesdropper UE, in accordance with the present disclosure.

As shown by reference number 402, a UE (UE 1) may communicate with a base station via a Uu link. A potential eavesdropper UE may be in proximity to the UE, and the potential eavesdropper UE may detect communications between the UE and the base station.

As shown by reference number 404, a first UE (UE 1) may communicate with a second UE (UE 2) via a sidelink interface. A potential eavesdropper UE may be in proximity to the first UE, and the potential eavesdropper UE may detect sidelink communications between the first UE and the second UE.

As indicated above, FIG. 4 is provided as an example. Other examples may differ from what is described with regard to FIG. 4.

Figure 5:
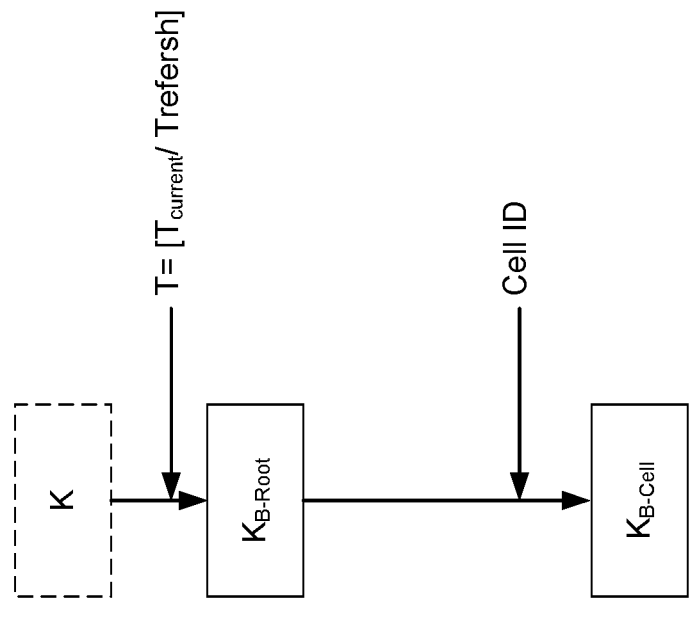
FIGS. 5-6 are diagrams illustrating examples of deriving cell-specific keys, in accordance with the present disclosure.

FIG. 5 is a diagram illustrating an example 500 of deriving a cell-specific key, in accordance with the present disclosure.

A UE may be provisioned with network-specific information. The network-specific information may include a long term key (K), a key refresh interval ($T_{Refresh}$), a current time ($T_{Current}$), a key identifier (ID) ($K_{ID}$), and/or a hyper frame number (HFN) and a system frame number (SFN).

A broadcast root key ($K_{B-Root}$) may be derived in accordance with: $K_{B-Root}$=KDF(K, T), where KDF is a key derivation function, K is the long term key, and $T=\lfloor T_{Current}/T_{Refresh}\rfloor$. The broadcast root key may optionally also depend on other network-specific parameters provisioned at the UE. T may be directly used as a key ID ($K_{ID}$) or associated with a key ID. Alternatively, the UE may be provisioned with the broadcast root key directly and a corresponding expiration time. In a baseline approach, a single broadcast root key may be supported at a time across a plurality of cells (e.g., all cells).

The UE may derive a cell-specific key ($K_{B-Cell}$) from the broadcast root key in accordance with: $K_{B-Cell}$=KDF($K_{B-Root}$, Cell ID), where the Cell ID may be a physical cell identifier (PCI) or an absolute radio-frequency channel number (ARFCN). A radio access network (RAN) node may be provisioned with the cell-specific key for each supported cell by a network operator, for example, via an access and mobility management function (AMF), unified data management (UDM), operations, administration and maintenance (OAM), or a new key management function (KMF).

As indicated above, FIG. 5 is provided as an example. Other examples may differ from what is described with regard to FIG. 5.

Figure 6:
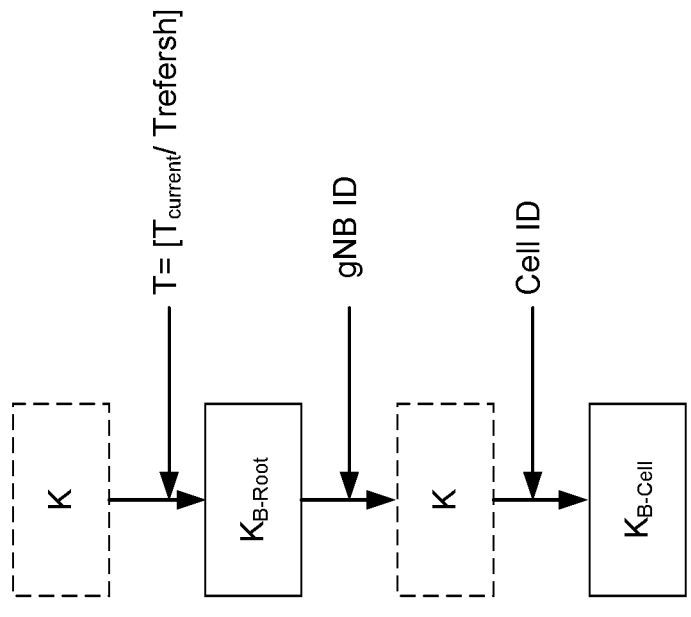

FIG. 6 is a diagram illustrating an example 600 of deriving a cell-specific key, in accordance with the present disclosure.

A UE may determine a broadcast root key ($K_{B-Root}$) in a same manner as a baseline case. For example, the UE may determine the broadcast root key in accordance with: $K_{B-Root}$=KDF(K, T), where KDF is a key derivation function, K is the long term key, and $T=\lfloor T_{Current}/T_{Refresh}\rfloor$. When multiple broadcast root keys (e.g., multiple $K_{B-Root}$ keys) are being used across different cells in a deployment at a same time, a key ID may be needed to determine the broadcast root key.

The UE may derive a RAN node-specific key ($K_{B-RAN}$) in accordance with: $K_{B-RAN}$=KDF($K_{B-Root}$, gNB ID), where gNB ID is a base station ID received in a synchronization signal block (SSB). A RAN node may be provisioned with the RAN node-specific key by a network operator, for example, via an AMF, a UDM, or an OAM. The UE and the RAN node may derive a cell-specific key ($K_{B-Cell}$) in accordance with: $K_{B-Cell}$=KDF($K_{B-RAN}$, Cell ID), where the Cell ID may be received in an SSB.

As indicated above, FIG. 6 is provided as an example. Other examples may differ from what is described with regard to FIG. 6.

Figure 7:
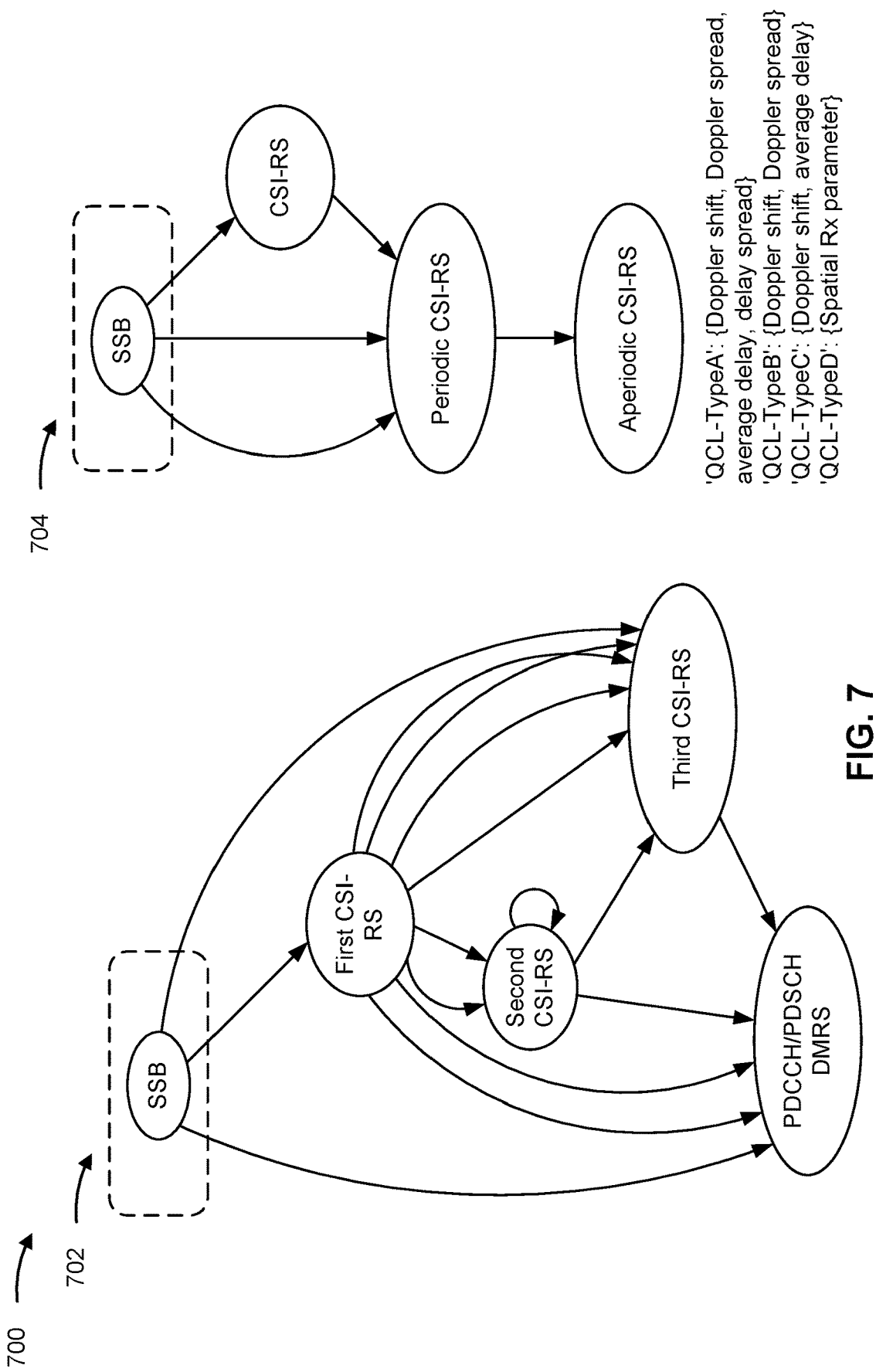
FIG. 7 is a diagram illustrating an example of downlink quasi co-locations (QCLs) associated with a synchronization signal block (SSB), in accordance with the present disclosure.

FIG. 7 is a diagram illustrating an example 700 of downlink quasi co-locations (QCLs) associated with an SSB, in accordance with the present disclosure.

As shown by reference number 702, an SSB may be a top QCL source, such that each downlink QCL may be rooted to the SSB. A first channel state information reference signal (CSI-RS) may have a certain relation or be quasi co-located with the SSB. A second CSI-RS may be quasi co-located with the first CSI-RS and the SSB. A third CSI-RS may be quasi-located with the first CSI-RS, the second CSI-RS, and the SSB. Different CSI-RSs may depend on whether a CSI-RS is with repetition, without repetition, and so on. A physical downlink control channel (PDCCH)/physical downlink shared channel (PDSCH) DMRS may be quasi co-located with the first CSI-RS, the second CSI-RS, the third CSI-RS, and the SSB. A channel estimation associated with the SSB may be applied to a channel estimation associated with the first CSI-RS, the channel estimation associated with the second CSI-RS may be applied to a channel estimation associated with a third CSI-RS, and so on.

A QCL between reference signals and/or the SSB may be a QCL-TypeA, a QCL-TypeB, a QCL-TypeC, and/or a QCL-TypeD. The QCL-TypeA may be associated with a Doppler shift, a Doppler spread, an average delay, and a delay spread. The QCL-TypeB may be associated with a Doppler shift and a Doppler spread. The QCL-TypeC may be associated with a Doppler shift and an average delay. The QCL-TypeD may be associated with a spatial Rx parameter.

As shown by reference number 704, an SSB may be a top QCL source, such that each downlink QCL may be rooted to the SSB. A CSI-RS may have a certain relation or be quasi co-located with the SSB. A periodic CSI-RS may be quasi co-located with the CSI-RS and the SSB. An aperiodic CSI-RS may be quasi-located with the periodic CSI-RS.

As indicated above, FIG. 7 is provided as an example. Other examples may differ from what is described with regard to FIG. 7.

Figure 8:
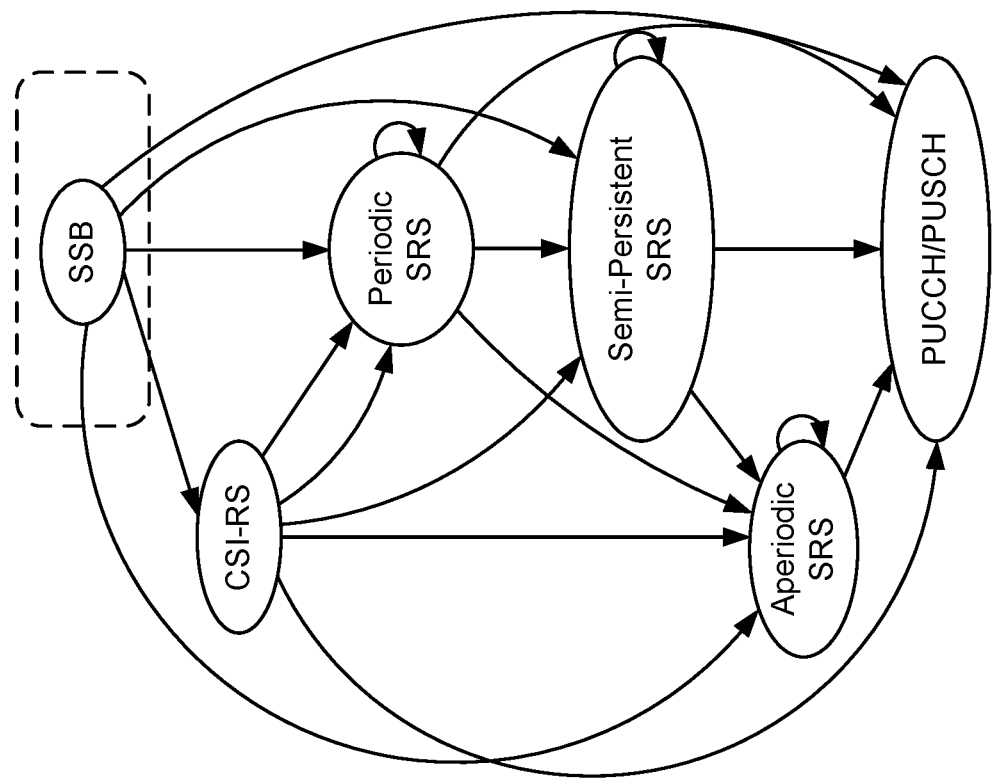
FIG. 8 is a diagram illustrating an example of uplink QCLs associated with an SSB, in accordance with the present disclosure.

FIG. 8 is a diagram illustrating an example 800 of uplink QCLs associated with an SSB, in accordance with the present disclosure.

An SSB may be a top QCL source, such that each uplink QCL may be rooted to the SSB. A CSI-RS may have a certain relation or be quasi co-located with the SSB. A periodic sounding reference signal (SRS) may be quasi co-located with the CSI-RS and the SSB. A semi-persistent SRS may be quasi co-located with the periodic SRS, the CSI-RS, and the SSB. An aperiodic SRS may be quasi co-located with the semi-persistent SRS, the periodic SRS, the CSI-RS, and the SSB. A PUCCH/physical uplink shared channel (PUSCH) may be quasi co-located with the aperiodic SRS, the semi-persistent SRS, the periodic SRS, the CSI-RS, and the SSB.

As indicated above, FIG. 8 is provided as an example. Other examples may differ from what is described with regard to FIG. 8.

In existing wireless systems, a channel (uplink or downlink) is not encrypted at a PHY layer. Encrypting the channel at the PHY layer may necessitate a secret key. The secret key may be generated by a key provided to the PHY layer from an upper layer and a set of PHY parameters. However, using a cell ID as a PHY parameter for secret key generation may not be robust since the cell ID may be detected by a UE in the cell.

In various aspects of techniques and apparatuses described herein, a UE (or a base station) may determine a secret key for encrypting a unicast physical channel at a PHY layer based at least in part on a key derivation function and a set of physical layer parameters. The secret key may be a UE-specific secret key. The UE may transmit, to the base station, an encrypted transmission over the unicast physical channel based at least in part on the secret key. Similarly, the base station may transmit, to the UE, an encrypted transmission over the unicast physical channel based at least in part on the secret key. As a result, the unicast physical channel may be secured at the PHY layer, thereby improving security between transmissions between the UE and the base station. The transmissions between the UE and the base station are less likely to be decoded by potential eavesdropper UEs due to the security of the unicast physical channel at the PHY layer.

In some aspects, the UE and the base station may generate the secret key to secure the unicast physical channel at the PHY layer. The UE and the base station may leverage various PHY parameters for generating the secret key to be used for encrypting the unicast physical channel. The various PHY parameters may be added to upper layer parameters, or may be used when L2 or L3 secret-key parameters are absent. Although higher layer security schemes may be implemented, implementing PHY layer security schemes may improve an overall system security, especially for channels which have no other security mechanisms (e.g., no upper layer security).

Figure 9:
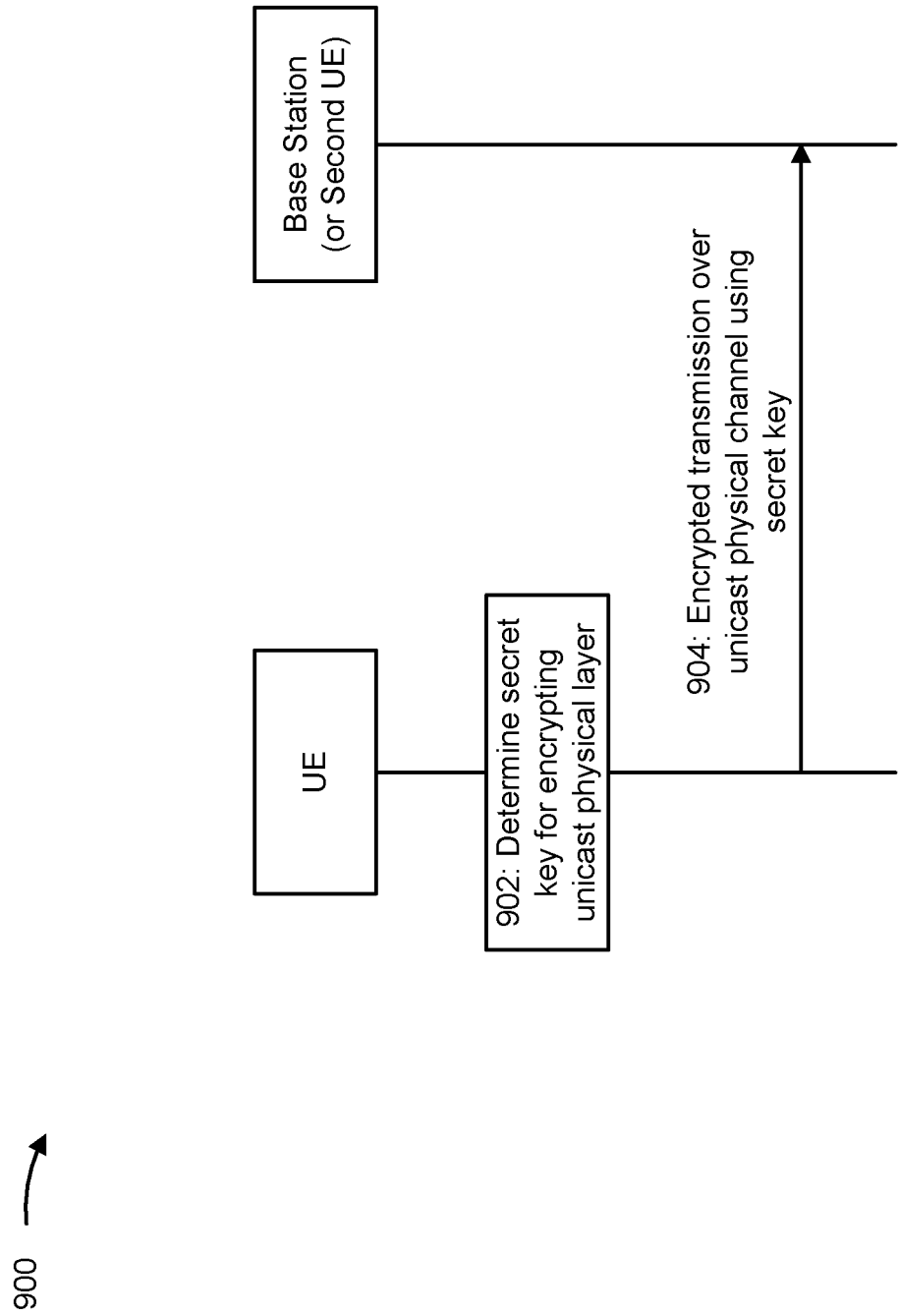
FIGS. 9-10 are diagrams illustrating examples associated with physical channel encryption using secret keys, in accordance with the present disclosure.

FIG. 9 is a diagram illustrating an example 900 associated with physical channel encryption using secret keys, in accordance with the present disclosure. As shown in FIG. 9, example 900 includes communication between a UE (e.g., UE 120) and a base station (e.g., base station 110). In some aspects, the UE and the base station may be included in a wireless network, such as wireless network 100.

As shown by reference number 902, the UE may determine a secret key for encrypting a unicast physical channel at a PHY layer based at least in part on a key derivation function and a set of PHY layer parameters. The secret key may be a UE-specific secret key. Similarly, the base station may determine the secret key for encrypting the unicast physical channel at the PHY layer based at least in part on the key derivation function and the set of PHY layer parameters.

In some aspects, the UE (or base station) may determine the secret key based at least in part on the key derivation function, a long term key (K), a time value (T) based at least in part on a key refresh interval ($T_{Refresh}$) and a current time ($T_{Current}$), an identifier associated with the base station, and the set of PHY layer parameters.

In some aspects, the UE (or base station) may determine the secret key based at least in part on the key derivation function, a broadcast root key ($K_{B\text{-}Root}$), and the set of PHY layer parameters, where the broadcast root key may be based at least in part on the key derivation function, the long term key, and the time value based at least in part on the key refresh interval and the current time.

In some aspects, the UE (or base station) may determine the secret key based at least in part on the key derivation function, a RAN node specific key ($K_{B\text{-}RAN}$), and the set of PHY layer parameters, where the RAN node specific key may be based at least in part on the key derivation function, the broadcast root key, and the identifier of the base station received in an SSB.

In some aspects, the set of PHY layer parameters may include a cell identifier, transmission configuration indicator (TCI) state information indicated for receiving or transmitting the unicast physical channel, a scrambling identifier for generating a DMRS for the unicast physical channel, a zone identifier, positioning information, and/or an active bandwidth part (BWP) configuration that indicates a BWP index and a BWP bandwidth. In some aspects, the UE may receive, from the base station, an indication of the set of PHY layer parameters.

In some aspects, when the set of PHY layer parameters include the TCI state information, the UE (or base station) may determine the secret key based at least in part on a resource identifier or a resource set identifier of a reference signal that functions as a source of a QCL for the unicast physical channel. The resource identifier or the resource set identifier may include an SSB index, a CSI-RS resource identifier, or an SRS resource identifier. In some aspects, when the set of PHY layer parameters include the TCI state information, the UE (or base station) may determine the secret key based at least in part on a QCL type, where the QCL type may be associated with a key reference that is used as an input to the key derivation function.

In some aspects, the set of physical layer parameters may be common for a plurality of unicast physical channels. In some aspects, the set of physical layer parameters may include at least one parameter that is different from at least one other parameter between a plurality of unicast physical channels. The set of physical layer parameters may include, for a PUCCH, a control resource identifier, a control resource set identifier, and a timing advance (TA) command. The set of physical layer parameters may include, for a PDCCH, a control channel monitoring configuration.

As shown by reference number 904, the UE may transmit, to the base station, an encrypted transmission over the unicast physical channel based at least in part on the secret key. Similarly, the base station may transmit, to the UE, an encrypted transmission over the unicast physical channel based at least in part on the secret key.

In some aspects, the UE may be a first UE that performs the encrypted transmission with a second UE over a sidelink interface. In this case, the first UE and the second UE may determine the secret key for encrypting the unicast physical channel at the PHY layer based at least in part on the key derivation function and the set of PHY layer parameters. The first UE may transmit, to the second UE, the encrypted transmission over the unicast physical channel based at least in part on the secret key.

As indicated above, FIG. 9 is provided as an example. Other examples may differ from what is described with regard to FIG. 9.

Figure 10:
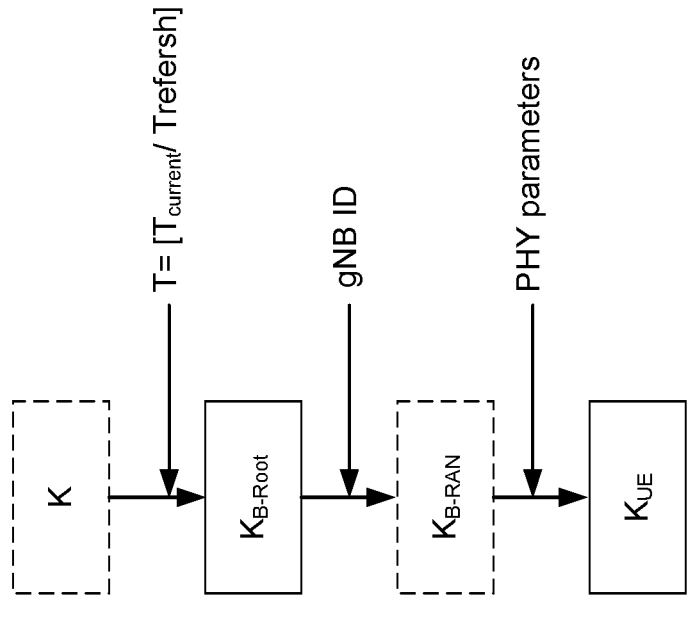

FIG. 10 is a diagram illustrating an example 1000 associated with physical channel encryption using secret keys, in accordance with the present disclosure.

In some aspects, a UE and a base station (e.g., a RAN node) may derive (or generate) a secret key ($K_{uE}$) for encrypting a unicast physical channel at a PHY layer based at least in part on a secret key provided by an upper layer and a set of PHY layer parameters. The UE and the base station may derive the secret key based at least in part on the secret key provided by the upper layer, with or without a broadcast root key ($K_{B\text{-}Root}$) or a RAN node specific key ($K_{B\text{-}RAN}$). In some aspects, the UE and the base station may derive the secret key in accordance with: $K_{UE}$=KDF(K, T, gNB ID, a set of PHY layer parameters). In some aspects, the UE and the base station may derive the secret key in accordance with: $K_{UE}$=KDF($K_{B\text{-}Root}$, a set of PHY layer parameters). In some aspects, the UE and the base station may derive the secret key in accordance with: $K_{UE}$=KDF($K_{B\text{-}RAN}$, a set of PHY layer parameters).

In some aspects, the set of PHY layer parameters may include a cell identifier, TCI state information indicated for receiving or transmitting the unicast physical channel, a scrambling identifier for generating a DMRS for the unicast physical channel, a zone identifier, positioning information (e.g., current positioning information, partial current positioning information, and/or positioning at certain previous times indicated by the base station), and/or an active BWP configuration (e.g., a BWP index and/or a BWP bandwidth). In some aspects, the base station (or a network) may indicate, to the UE, the set of PHY layer parameters to enable the UE to derive the secret key for encrypting the unicast physical channel. The UE may use the set of PHY layer parameters to derive the secret key using a key derivation function.

In some aspects, when the TCI state information is a part of the PHY layer parameters, the UE and the base station may determine the secret key using a resource identifier or a resource set identifier of a reference signal that functions as a source of a QCL for the unicast physical channel. For example, the UE and the base station may determine the secret key using an SSB index, a CSI-RS resource identifier, and/or an SRS resource identifier. In some aspects, when the TCI state information is a part of the PHY layer parameters, the UE and the base station may determine the secret key using a QCL type. For example, for a QCL type A, a first key reference may be used, for a QCL type B, a second key reference may be used, and so on. A key reference may be a deterministic seed based at least in part on the QCL type. The key reference may be hashed to form a hashed reference key, and the hashed reference key may be used as an input to the key derivation function.

In some aspects, the set of PHY layer parameters may be common for a plurality of physical channels. Alternatively, the set of PHY layer parameters may be different for a plurality of physical channels. For example, for a PUCCH, the set of PHY layer parameters may further include a control resource identifier, a control resource set identifier, and/or a TA command. For a PDCCH, the set of PHY layer parameters may further include a control channel monitoring configuration.

As indicated above, FIG. 10 is provided as an example. Other examples may differ from what is described with regard to FIG. 10.

Figure 11:
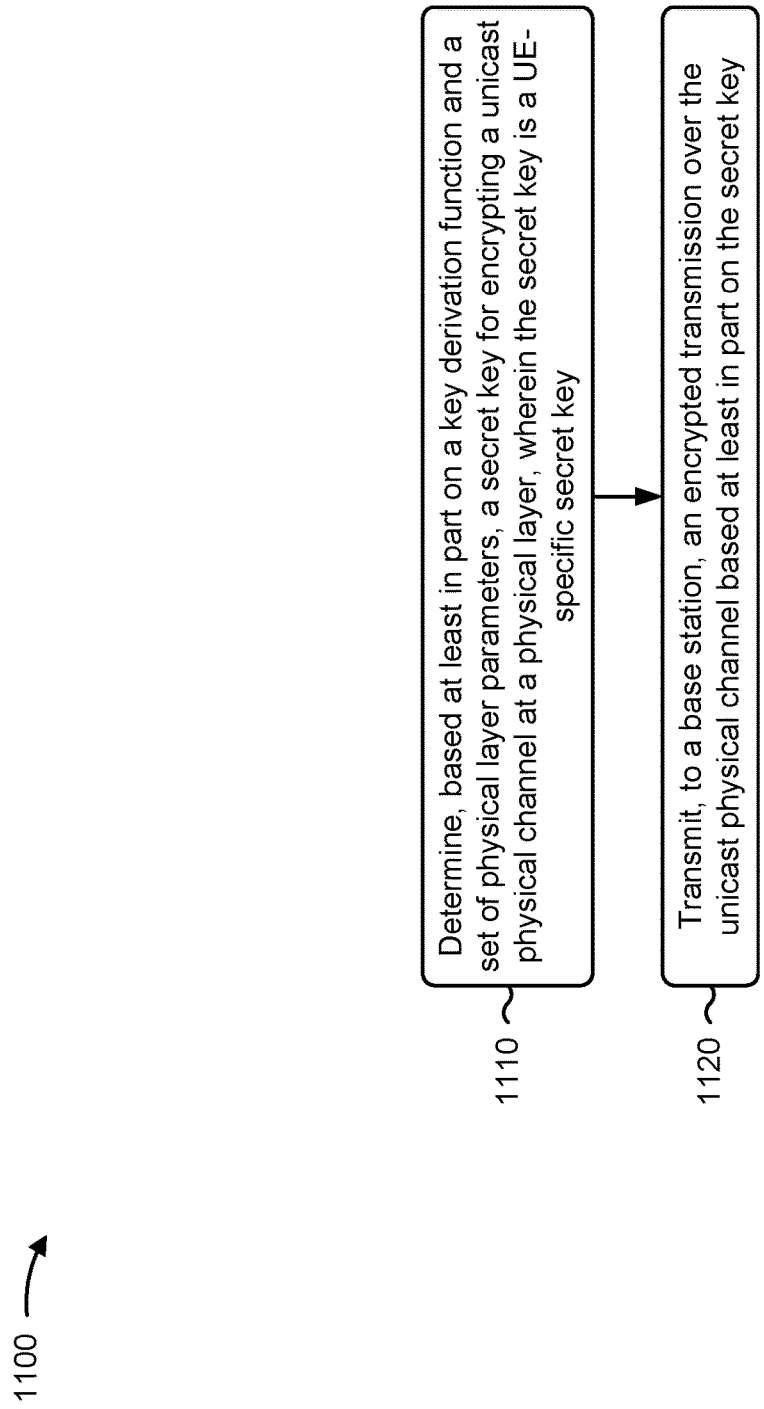
FIGS. 11-12 are diagrams illustrating example processes associated with physical channel encryption using secret keys, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with physical channel encryption using secret keys.

As shown in FIG. 11, in some aspects, process 1100 may include determining, based at least in part on a key derivation function and a set of physical layer parameters, a secret key for encrypting a unicast physical channel at a physical layer, wherein the secret key is a UE-specific secret key (block 1110). For example, the UE (e.g., using communication manager 140 and/or determination component 1308, depicted in FIG. 13) may determine, based at least in part on a key derivation function and a set of physical layer parameters, a secret key for encrypting a unicast physical channel at a physical layer, wherein the secret key is a UE-specific secret key, as described above.

As further shown in FIG. 11, in some aspects, process 1100 may include transmitting, to a base station, an encrypted transmission over the unicast physical channel based at least in part on the secret key (block 1120). For example, the UE (e.g., using communication manager 140 and/or transmission component 1304, depicted in FIG. 13) may transmit, to a base station, an encrypted transmission over the unicast physical channel based at least in part on the secret key, as described above.

Process 1100 may include additional aspects, such as any single aspect or any combination of aspects described below and/or in connection with one or more other processes described elsewhere herein.

In a first aspect, process 1100 includes determining the secret key based at least in part on the key derivation function, a long term key, a time value based at least in part on a key refresh interval and a current time, an identifier associated with the base station, and the set of physical layer parameters.

In a second aspect, alone or in combination with the first aspect, process 1100 includes determining the secret key based at least in part on the key derivation function, a broadcast root key, and the set of physical layer parameters, wherein the broadcast root key is based at least in part on the key derivation function, a long term key, and a time value based at least in part on a key refresh interval and a current time.

In a third aspect, alone or in combination with one or more of the first and second aspects, process 1100 includes determining the secret key based at least in part on the key derivation function, a RAN node specific key, and the set of physical layer parameters, wherein the RAN node specific key is based at least in part on the key derivation function, a broadcast root key, and an identifier of the base station received in an SSB.

In a fourth aspect, alone or in combination with one or more of the first through third aspects, the set of physical layer parameters include one or more of a cell identifier, and TCI state information is indicated for receiving or transmitting the unicast physical channel, a scrambling identifier for generating a DMRS for the unicast physical channel, a zone identifier, positioning information, or an active BWP configuration that indicates a BWP index and a BWP bandwidth.

In a fifth aspect, alone or in combination with one or more of the first through fourth aspects, the set of physical layer parameters include TCI state information, and process 1100 includes determining the secret key based at least in part on a resource identifier or a resource set identifier of a reference signal that functions as a source of a QL for the unicast physical channel, wherein the resource identifier or the resource set identifier includes an SSB index, a CSI-RS resource identifier, or an SRS resource identifier.

In a sixth aspect, alone or in combination with one or more of the first through fifth aspects, the set of physical layer parameters include TCI state information, and process 1100 includes determining the secret key based at least in part on a QCL type, wherein the QCL type is associated with a key reference that is used as an input to the key derivation function.

In a seventh aspect, alone or in combination with one or more of the first through sixth aspects, the set of physical layer parameters is common for a plurality of unicast physical channels.

In an eighth aspect, alone or in combination with one or more of the first through seventh aspects, the set of physical layer parameters includes at least one parameter that is different from at least one other parameter between a plurality of unicast physical channels, wherein the set of physical layer parameters includes, for a PUCCH, a control resource identifier, a control resource set identifier, and a TA command, and the set of physical layer parameters includes, for a PDCCH, a control channel monitoring configuration.

In a ninth aspect, alone or in combination with one or more of the first through eighth aspects, process 1100 includes receiving, from the base station, an indication of the set of physical layer parameters.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
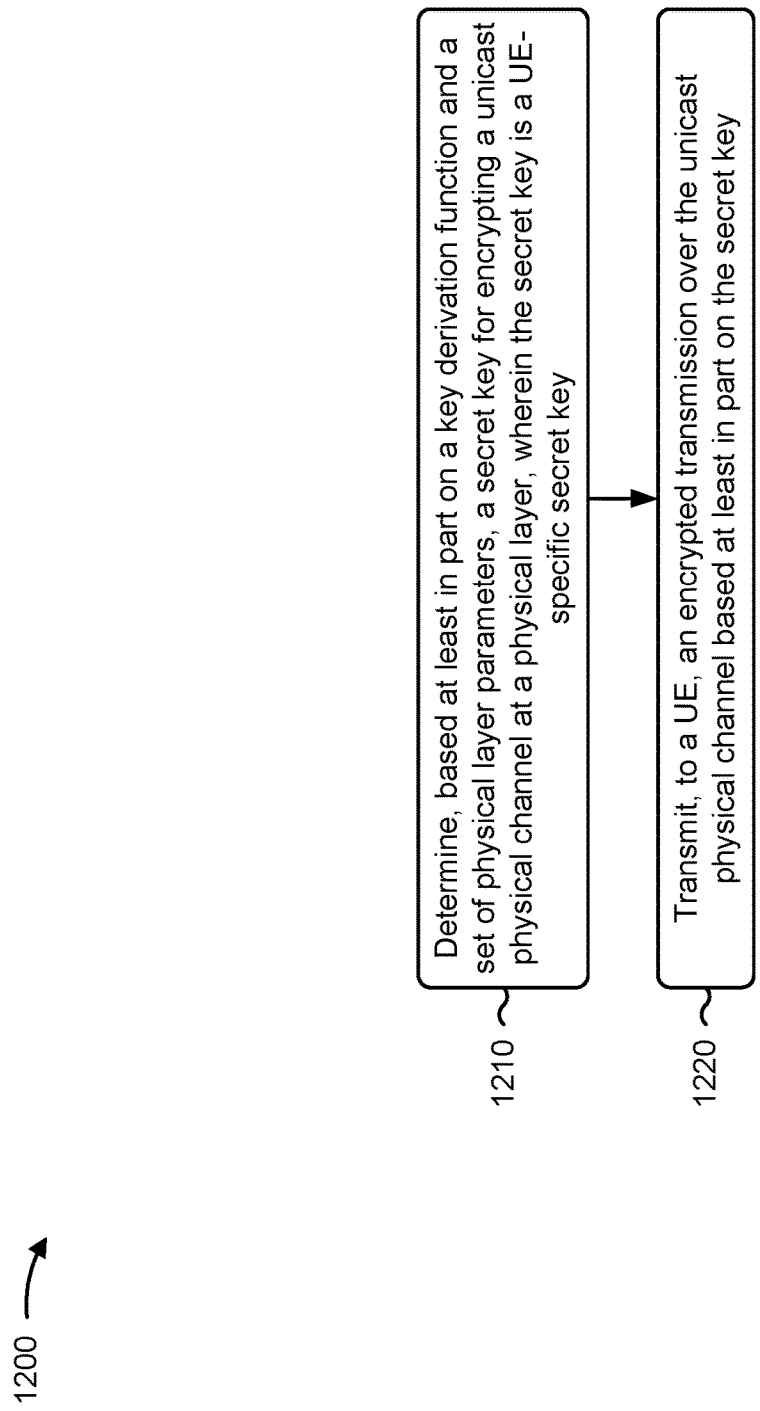

FIG. 12 is a diagram illustrating an example process 1200 performed, for example, by a base station, in accordance with the present disclosure. Example process 1200 is an example where the base station (e.g., base station 110) performs operations associated with physical channel encryption using secret keys.

As shown in FIG. 12, in some aspects, process 1200 may include determining, based at least in part on a key derivation function and a set of physical layer parameters, a secret key for encrypting a unicast physical channel at a physical layer, wherein the secret key is a UE-specific secret key (block 1210). For example, the base station (e.g., using communication manager 150 and/or determination component 1408, depicted in FIG. 14) may determine, based at least in part on a key derivation function and a set of physical layer parameters, a secret key for encrypting a unicast physical channel at a physical layer, wherein the secret key is a UE-specific secret key, as described above.

As further shown in FIG. 12, in some aspects, process 1200 may include transmitting, to a UE, an encrypted transmission over the unicast physical channel based at least in part on the secret key (block 1220). For example, the base station (e.g., using communication manager 150 and/or transmission component 1404, depicted in FIG. 14) may transmit, to a UE, an encrypted transmission over the unicast physical channel based at least in part on the secret key, as described above.

Process 1200 may include additional aspects, such as any single aspect or any combination of aspects described below and/or in connection with one or more other processes described elsewhere herein.

In a first aspect, process 1200 includes determining the secret key based at least in part on the key derivation function, a long term key, a time value based at least in part on a key refresh interval and a current time, an identifier associated with the base station, and the set of physical layer parameters.

In a second aspect, alone or in combination with the first aspect, process 1200 includes determining the secret key based at least in part on the key derivation function, a broadcast root key, and the set of physical layer parameters, wherein the broadcast root key is based at least in part on the key derivation function, a long term key, and a time value based at least in part on a key refresh interval and a current time.

In a third aspect, alone or in combination with one or more of the first and second aspects, process 1200 includes determining the secret key based at least in part on the key derivation function, a RAN node specific key, and the set of physical layer parameters, wherein the RAN node specific key is based at least in part on the key derivation function, a broadcast root key, and an identifier of the base station received in an SSB.

In a fourth aspect, alone or in combination with one or more of the first through third aspects, the set of physical layer parameters include one or more of a cell identifier, TCI state information indicated for receiving or transmitting the unicast physical channel, a scrambling identifier for generating a DMRS for the unicast physical channel, a zone identifier, positioning information, or an active BWP configuration that indicates a BWP index and a BWP bandwidth.

In a fifth aspect, alone or in combination with one or more of the first through fourth aspects, the set of physical layer parameters include TCI state information, and process 1200 includes determining the secret key based at least in part on a resource identifier or a resource set identifier of a reference signal that functions as a source of a QCL for the unicast physical channel, wherein the resource identifier or the resource set identifier includes an SSB index, a CSI-RS resource identifier, or an SRS resource identifier.

In a sixth aspect, alone or in combination with one or more of the first through fifth aspects, the set of physical layer parameters include TCI state information, and process 1200 includes determining the secret key based at least in part on a QCL type, wherein the QCL type is associated with a key reference that is used as an input to the key derivation function.

In a seventh aspect, alone or in combination with one or more of the first through sixth aspects, the set of physical layer parameters is common for a plurality of unicast physical channels.

In an eighth aspect, alone or in combination with one or more of the first through seventh aspects, the set of physical layer parameters includes at least one parameter that is different from at least one other parameter between a plurality of unicast physical channels, wherein the set of physical layer parameters includes, for a PUCCH, a control resource identifier, a control resource set identifier, and a timing advance command, and the set of physical layer parameters includes, for a PDCCH, a control channel monitoring configuration.

In a ninth aspect, alone or in combination with one or more of the first through eighth aspects, process 1200 includes transmitting, to the UE, an indication of the set of physical layer parameters.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
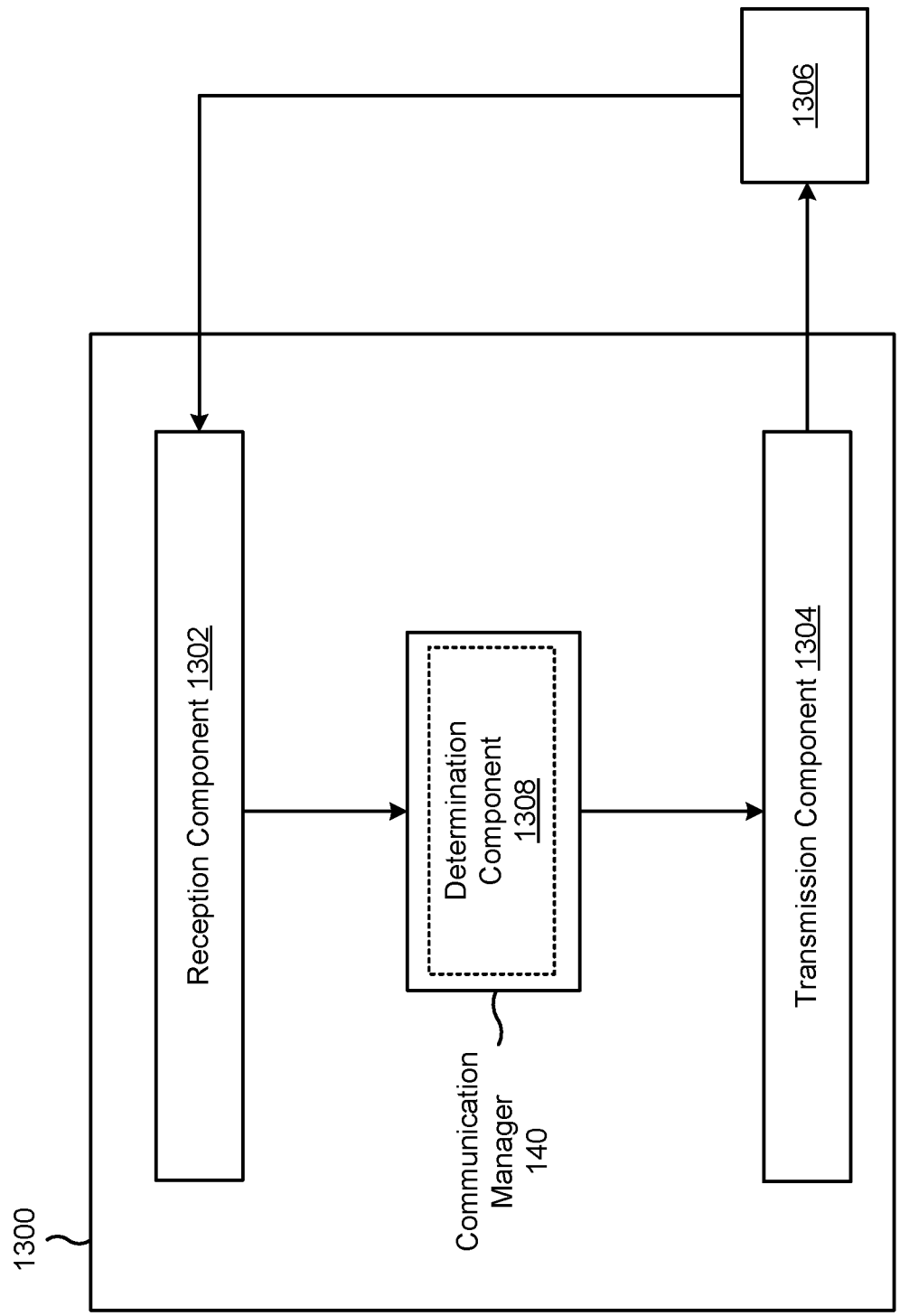
FIGS. 13-14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a determination component 1308, among other examples.

In some aspects, the apparatus 1300 may be configured to perform one or more operations described herein in connection with FIGS. 9-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The determination component 1308 may determine, based at least in part on a key derivation function and a set of physical layer parameters, a secret key for encrypting a unicast physical channel at a physical layer, wherein the secret key is a UE-specific secret key. The transmission component 1304 may transmit, to a base station, an encrypted transmission over the unicast physical channel based at least in part on the secret key. The reception component 1302 may receive, from the base station, an indication of the set of physical layer parameters.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
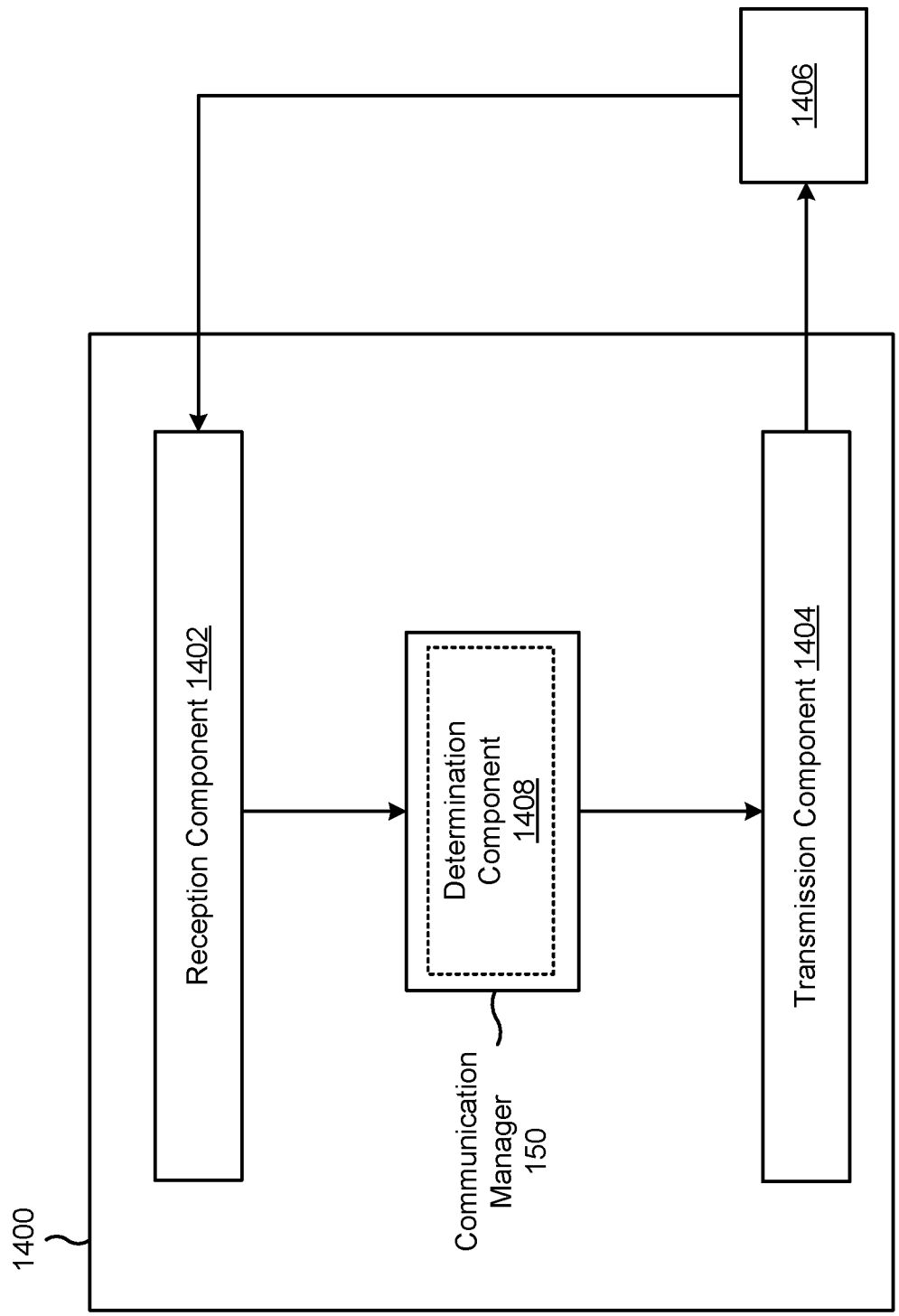

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a determination component 1408, among other examples.

In some aspects, the apparatus 1400 may be configured to perform one or more operations described herein in connection with FIGS. 9-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The determination component 1408 may determine, based at least in part on a key derivation function and a set of physical layer parameters, a secret key for encrypting a unicast physical channel at a physical layer, wherein the secret key is a UE-specific secret key. The transmission component 1404 may transmit, to a UE, an encrypted transmission over the unicast physical channel based at least in part on the secret key. The transmission component 1404 may transmit, to the UE, an indication of the set of physical layer parameters.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: determining, based at least in part on a key derivation function and a set of physical layer parameters, a secret key for encrypting a unicast physical channel at a physical layer, wherein the secret key is a UE-specific secret key; and transmitting, to a base station, an encrypted transmission over the unicast physical channel based at least in part on the secret key.

Aspect 2: The method of Aspect 1, wherein determining the secret key comprises determining the secret key based at least in part on the key derivation function, a long term key, a time value based at least in part on a key refresh interval and a current time, an identifier associated with the base station, and the set of physical layer parameters.

Aspect 3: The method of any of Aspects 1 through 2, wherein determining the secret key comprises determining the secret key based at least in part on the key derivation function, a broadcast root key, and the set of physical layer parameters, wherein the broadcast root key is based at least in part on the key derivation function, a long term key, and a time value based at least in part on a key refresh interval and a current time.

Aspect 4: The method of any of Aspects 1 through 3, wherein determining the secret key comprises determining the secret key based at least in part on the key derivation function, a radio access network (RAN) node specific key, and the set of physical layer parameters, wherein the RAN node specific key is based at least in part on the key derivation function, a broadcast root key, and an identifier of the base station received in a synchronization signal block.

Aspect 5: The method of any of Aspects 1 through 4, wherein the set of physical layer parameters include one or more of: a cell identifier, transmission configuration indicator state information indicated for receiving or transmitting the unicast physical channel, a scrambling identifier for generating a demodulation reference signal for the unicast physical channel, a zone identifier, positioning information, or an active bandwidth part (BWP) configuration that indicates a BWP index and a BWP bandwidth.

Aspect 6: The method of any of Aspects 1 through 5, wherein the set of physical layer parameters include transmission configuration indicator state information, and further comprising determining the secret key based at least in part on a resource identifier or a resource set identifier of a reference signal that functions as a source of a quasi co-location for the unicast physical channel, wherein the resource identifier or the resource set identifier includes a synchronization signal block index, a channel state information reference signal resource identifier, or a sounding reference signal resource identifier.

Aspect 7: The method of any of Aspects 1 through 6, wherein the set of physical layer parameters include transmission configuration indicator state information, and further comprising determining the secret key based at least in part on a quasi co-location (QCL) type, wherein the QCL type is associated with a key reference that is used as an input to the key derivation function.

Aspect 8: The method of any of Aspects 1 through 7, wherein the set of physical layer parameters is common for a plurality of unicast physical channels.

Aspect 9: The method of any of Aspects 1 through 8, wherein the set of physical layer parameters includes at least one parameter that is different from at least one other parameter between a plurality of unicast physical channels, wherein the set of physical layer parameters includes, for a physical uplink control channel, a control resource identifier, a control resource set identifier, and a timing advance command, and wherein the set of physical layer parameters includes, for a physical downlink control channel, a control channel monitoring configuration.

Aspect 10: The method of any of Aspects 1 through 9, further comprising: receiving, from the base station, an indication of the set of physical layer parameters.

Aspect 11: A method of wireless communication performed by a base station, comprising: determining, based at least in part on a key derivation function and a set of physical layer parameters, a secret key for encrypting a unicast physical channel at a physical layer, wherein the secret key is a UE-specific secret key; and transmitting, to a user equipment (UE), an encrypted transmission over the unicast physical channel based at least in part on the secret key.

Aspect 12: The method of Aspect 11, wherein determining the secret key comprises determining the secret key based at least in part on the key derivation function, a long term key, a time value based at least in part on a key refresh interval and a current time, an identifier associated with the base station, and the set of physical layer parameters.

Aspect 13: The method of any of Aspects 11 through 12, wherein determining the secret key comprises determining the secret key based at least in part on the key derivation function, a broadcast root key, and the set of physical layer parameters, wherein the broadcast root key is based at least in part on the key derivation function, a long term key, and a time value based at least in part on a key refresh interval and a current time.

Aspect 14: The method of any of Aspects 11 through 13, wherein determining the secret key comprises determining the secret key based at least in part on the key derivation function, a radio access network (RAN) node specific key, and the set of physical layer parameters, wherein the RAN node specific key is based at least in part on the key derivation function, a broadcast root key, and an identifier of the base station received in a synchronization signal block.

Aspect 15: The method of any of Aspects 11 through 14, wherein the set of physical layer parameters include one or more of: a cell identifier, transmission configuration indicator state information indicated for receiving or transmitting the unicast physical channel, a scrambling identifier for generating a demodulation reference signal for the unicast physical channel, a zone identifier, positioning information, or an active bandwidth part (BWP) configuration that indicates a BWP index and a BWP bandwidth.

Aspect 16: The method of any of Aspects 11 through 15, wherein the set of physical layer parameters include transmission configuration indicator state information, and further comprising determining the secret key based at least in part on a resource identifier or a resource set identifier of a reference signal that functions as a source of a quasi co-location for the unicast physical channel, wherein the resource identifier or the resource set identifier includes a synchronization signal block index, a channel state information reference signal resource identifier, or a sounding reference signal resource identifier.

Aspect 17: The method of any of Aspects 11 through 16, wherein the set of physical layer parameters include transmission configuration indicator state information, and further comprising determining the secret key based at least in part on a quasi co-location (QCL) type, wherein the QCL type is associated with a key reference that is used as an input to the key derivation function.

Aspect 18: The method of any of Aspects 11 through 17, wherein the set of physical layer parameters is common for a plurality of unicast physical channels.

Aspect 19: The method of any of Aspects 11 through 18, wherein the set of physical layer parameters includes at least one parameter that is different from at least one other parameter between a plurality of unicast physical channels, wherein the set of physical layer parameters includes, for a physical uplink control channel, a control resource identifier, a control resource set identifier, and a timing advance command, and wherein the set of physical layer parameters includes, for a physical downlink control channel, a control channel monitoring configuration.

Aspect 20: The method of any of Aspects 11 through 19, further comprising: transmitting, to the UE, an indication of the set of physical layer parameters.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
   generate a secret key for encrypting a unicast physical channel at a layer 1 (L1) physical layer for L1 physical signaling based at least in part on a key derivation function and one or more of:
   a parameter associated with a transmission configuration indicator (TCI) state,
   a parameter associated with a reference signal,
   a parameter associated with a zone identifier,
   a parameter associated with positioning information, or
   a parameter associated with a bandwidth part (BWP); and
   transmit, to a base station, an encrypted transmission over the unicast physical channel via the L1 physical signaling and using the secret key.

2. The apparatus of claim 1, wherein the one or more processors, to generate the secret key, are configured to:
   generate the secret key based at least in part on a long term key, a time value based at least in part on a key refresh interval and a current time, and an identifier associated with the base station.

3. The apparatus of claim 1, wherein the one or more processors, to generate the secret key, are configured to:
   generate the secret key based at least in part on a broadcast root key, wherein the broadcast root key is based at least in part on the key derivation function, a long term key, and a time value based at least in part on a key refresh interval and a current time.

4. The apparatus of claim 1, wherein the one or more processors, to generate the secret key, are configured to:
   generate the secret key based at least in part on a radio access network (RAN) node specific key, wherein the RAN node specific key is based at least in part on the key derivation function, a broadcast root key, and an identifier of the base station received in a synchronization signal block.

5. The apparatus of claim 1, wherein:
   the parameter associated with the TCI state is TCI state information indicated for receiving or transmitting the unicast physical channel,
   the parameter associated with the reference signal is a scrambling identifier for generating a demodulation reference signal for the unicast physical channel, and
   the parameter associated with the BWP is an active BWP configuration that indicates a BWP index and a BWP bandwidth.

6. The apparatus of claim 1, wherein the secret key is generated based at least in part on the parameter associated with the TCI state, and wherein the one or more processors are further configured to:
generate the secret key based at least in part on a resource identifier or a resource set identifier of a reference signal that functions as a source of a quasi co-location for the unicast physical channel, wherein the resource identifier or the resource set identifier includes a synchronization signal block index, a channel state information reference signal resource identifier, or a sounding reference signal resource identifier.

7. The apparatus of claim 1, wherein the secret key is generated based at least in part on the parameter associated with the TCI state, and wherein the one or more processors are further configured to:
generate the secret key based at least in part on a quasi co-location (QCL) type, wherein the QCL type is associated with a key reference that is used as an input to the key derivation function.

8. The apparatus of claim 1, wherein the parameter associated with the TCI state, the parameter associated with the reference signal, the parameter associated with the zone identifier, the parameter associated with positioning information, or the parameter associated with the BWP is common for a plurality of unicast physical channels.

9. The apparatus of claim 1, wherein the one or more processors, to generate the secret key, are configured to:
generate the secret key, for a physical uplink control channel, based at least in part on a control resource identifier, a control resource set identifier, and a timing advance command, or
generate the secret key, for a physical downlink control channel, based at least in part on a control channel monitoring configuration.

10. The apparatus of claim 1, wherein the one or more processors are further configured to:
receive, from the base station, an indication of the parameter associated with the TCI state, the parameter associated with the reference signal, the parameter associated with the zone identifier, the parameter associated with positioning information, or the parameter associated with the BWP.

11. An apparatus for wireless communication at a base station, comprising:
one or more memories; and
one or more processors, coupled to the one or more memories, configured to:
generate a secret key for encrypting a unicast physical channel at a layer 1 (L1) physical layer for L1 physical signaling based at least in part on a key derivation function and one or more of:
a parameter associated with a transmission configuration indicator (TCI) state,
a parameter associated with a reference signal,
a parameter associated with a zone identifier,
a parameter associated with positioning information, or
a parameter associated with a bandwidth part (BWP); and
transmit, to a user equipment (UE), an encrypted transmission over the unicast physical channel via the L1 physical signaling and using the secret key.

12. The apparatus of claim 11, wherein the one or more processors, to generate the secret key, are configured to:
generate the secret key based at least in part on a long term key, a time value based at least in part on a key refresh interval and a current time, and an identifier associated with the base station.

13. The apparatus of claim 11, wherein the one or more processors, to generate the secret key, are configured to:
generate the secret key based at least in part on a broadcast root key, wherein the broadcast root key is based at least in part on the key derivation function, a long term key, and a time value based at least in part on a key refresh interval and a current time.

14. The apparatus of claim 11, wherein the one or more processors, to generate the secret key, are configured to:
generate the secret key based at least in part on a radio access network (RAN) node specific key, wherein the RAN node specific key is based at least in part on the key derivation function, a broadcast root key, and an identifier of the base station received in a synchronization signal block.

15. The apparatus of claim 11, wherein:
the parameter associated with the TCI state is TCI state information indicated for receiving or transmitting the unicast physical channel,
the parameter associated with the reference signal is a scrambling identifier for generating a demodulation reference signal for the unicast physical channel, and
the parameter associated with the BWP is an active BWP configuration that indicates a BWP index and a BWP bandwidth.

16. The apparatus of claim 11, wherein the secret key is generated based at least in part on the parameter associated with the TCI state, and wherein the one or more processors are further configured to:
generate the secret key based at least in part on a resource identifier or a resource set identifier of a reference signal that functions as a source of a quasi co-location for the unicast physical channel, wherein the resource identifier or the resource set identifier includes a synchronization signal block index, a channel state information reference signal resource identifier, or a sounding reference signal resource identifier.

17. The apparatus of claim 11, wherein the secret key is generated based at least in part on the parameter associated with the TCI state, and wherein the one or more processors are further configured to:
generate the secret key based at least in part on a quasi co-location (QCL) type, wherein the QCL type is associated with a key reference that is used as an input to the key derivation function.

18. The apparatus of claim 11, wherein the parameter associated with the TCI state, the parameter associated with the reference signal, the parameter associated with the zone identifier, the parameter associated with positioning information, or the parameter associated with the BWP is common for a plurality of unicast physical channels.

19. The apparatus of claim 11, wherein the one or more processors, to generate the secret key, are configured to:
generate the secret key, for a physical uplink control channel, based at least in part on a control resource identifier, a control resource set identifier, and a timing advance command, or
generate the secret key, for a physical downlink control channel, based at least in part on a control channel monitoring configuration.

20. The apparatus of claim 11, wherein the one or more processors are further configured to:
transmit, to the UE, an indication of the parameter associated with the TCI state, the parameter associated with the reference signal, the parameter associated with the zone identifier, the parameter associated with positioning information, or the parameter associated with the BWP.

21. A method of wireless communication performed by a user equipment (UE), comprising:
generating a secret key for encrypting a unicast physical channel at a layer 1 (L1) physical layer for L1 physical signaling based at least in part on a key derivation function and one or more of:
a parameter associated with a transmission configuration indicator (TCI) state,
a parameter associated with a reference signal,
a parameter associated with a zone identifier,
a parameter associated with positioning information, or
a parameter associated with a bandwidth part (BWP); and
transmitting, to a base station, an encrypted transmission over the unicast physical channel via the L1 physical signaling and using the secret key.

22. The method of claim 21, wherein:
generating the secret key comprises generating the secret key based at least in part on a long term key, a time value based at least in part on a key refresh interval and a current time, and an identifier associated with the base station;
generating the secret key comprises generating the secret key based at least in part on a broadcast root key, wherein the broadcast root key is based at least in part on the key derivation function, a long term key, and a time value based at least in part on a key refresh interval and a current time; or
generating the secret key comprises generating the secret key based at least in part on a radio access network (RAN) node specific key, wherein the RAN node specific key is based at least in part on the key derivation function, a broadcast root key, and an identifier of the base station received in a synchronization signal block.

23. The method of claim 21, wherein:
the parameter associated with the TCI state is TCI state information indicated for receiving or transmitting the unicast physical channel,
the parameter associated with the reference signal is a scrambling identifier for generating a demodulation reference signal for the unicast physical channel, and
the parameter associated with the BWP is an active BWP configuration that indicates a BWP index and a BWP bandwidth.

24. The method of claim 21, wherein the secret key is generated based at least in part on the parameter associated with the TCI state, and further comprising:
generating the secret key based at least in part on a resource identifier or a resource set identifier of a reference signal that functions as a source of a quasi co-location (QCL) for the unicast physical channel, wherein the resource identifier or the resource set identifier includes a synchronization signal block index, a channel state information reference signal resource identifier, or a sounding reference signal resource identifier; or
generating the secret key based at least in part on a QCL type, wherein the QCL type is associated with a key reference that is used as an input to the key derivation function.

25. The method of claim 21, wherein:
the parameter associated with the TCI state, the parameter associated with the reference signal, the parameter associated with the zone identifier, the parameter associated with positioning information, or the parameter associated with the BWP is common for a plurality of unicast physical channels.

26. A method of wireless communication performed by a base station, comprising:
generating a secret key for encrypting a unicast physical channel at a layer 1 (L1) physical layer for L1 physical signaling based at least in part on a key derivation function and one or more of:
a parameter associated with a transmission configuration indicator (TCI) state,
a parameter associated with a reference signal,
a parameter associated with a zone identifier,
a parameter associated with positioning information, or
a parameter associated with a bandwidth part (BWP); and
transmitting, to a user equipment (UE), an encrypted transmission over the unicast physical channel via the L1 physical signaling and using the secret key.

27. The method of claim 26, wherein:
generating the secret key comprises generating the secret key based at least in part on a long term key, a time value based at least in part on a key refresh interval and a current time, and an identifier associated with the base station;
generating the secret key comprises generating the secret key based at least in part on a broadcast root key, wherein the broadcast root key is based at least in part on the key derivation function, a long term key, and a time value based at least in part on a key refresh interval and a current time; or
generating the secret key comprises generating the secret key based at least in part on a radio access network (RAN) node specific key, wherein the RAN node specific key is based at least in part on the key derivation function, a broadcast root key, and an identifier of the base station received in a synchronization signal block.

28. The method of claim 26, wherein:
the parameter associated with the TCI state is TCI state information indicated for receiving or transmitting the unicast physical channel,
the parameter associated with the reference signal is a scrambling identifier for generating a demodulation reference signal for the unicast physical channel, and
the parameter associated with the BWP is an active BWP configuration that indicates a BWP index and a BWP bandwidth.

29. The method of claim 26, wherein the secret key is generated based at least in part on the parameter associated with the TCI state, and further comprising:
generating the secret key based at least in part on a resource identifier or a resource set identifier of a reference signal that functions as a source of a quasi co-location (QCL) for the unicast physical channel, wherein the resource identifier or the resource set identifier includes a synchronization signal block index, a channel state information reference signal resource identifier, or a sounding reference signal resource identifier; or generating the secret key based at least in part on a QCL type, wherein the QCL type is associated with a key reference that is used as an input to the key derivation function.

30. The method of claim 26, wherein:

the parameter associated with the TCI state, the parameter associated with the reference signal, the parameter associated with the zone identifier, the parameter associated with positioning information, or the parameter associated with the BWP is common for a plurality of unicast physical channels.

* * * * *